US012674305B2

(12) United States Patent
Hegenbart et al.

(10) Patent No.: US 12,674,305 B2
(45) Date of Patent: Jul. 7, 2026

---

(54) WATER SUPPLY SYSTEM FOR USE IN AN AIRCRAFT AND A METHOD FOR PREVENTING FREEZING OF WATER LINES

(71) Applicant: Airbus Operations GmbH, Hamburg (DE)

(72) Inventors: Matthias Hegenbart, Hamburg (DE); Frederik Albers, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 126 days.

(21) Appl. No.: 18/653,376

(22) Filed: May 2, 2024

(65) Prior Publication Data

US 2024/0368860 A1     Nov. 7, 2024

(30) Foreign Application Priority Data

May 3, 2023     (EP) ..................................... 23171369

(51) Int. Cl.
| | |
|---|---|
| *B64D 47/00* | (2006.01) |
| *B64D 11/02* | (2006.01) |
| *B64D 11/04* | (2006.01) |
| *B64D 15/02* | (2006.01) |
| *E03B 7/12* | (2006.01) |
| *F16L 53/32* | (2018.01) |

(52) U.S. Cl.
CPC ................ *E03B 7/12* (2013.01); *B64D 11/02* (2013.01); *B64D 11/04* (2013.01); *B64D 15/02* (2013.01); *B64D 47/00* (2013.01); *F16L 53/32* (2018.01)

(58) Field of Classification Search
CPC ........... E03B 7/12; E03B 7/095; B64D 47/00; B64D 11/02; B64D 15/02; B64D 11/04; B64D 11/00; F16L 53/32
See application file for complete search history.

(56) References Cited

U.S. PATENT DOCUMENTS

| | | | |
|---|---|---|---|
| 3,378,673 A | 4/1968 | Hopper | |
| 7,203,419 B2 | 4/2007 | Malone et al. | |
| 10,822,774 B2 | 11/2020 | Lübbert et al. | |
| 2013/0048128 A1 | 2/2013 | Roederer et al. | |
| 2014/0367070 A1* | 12/2014 | Burd ................. | B64D 11/0007 165/58 |
| 2022/0342431 A1 | 10/2022 | Schreiner et al. | |

OTHER PUBLICATIONS

European Search Report for corresponding European Patent Application No. 23171369.4 dated Sep. 25, 2023.

* cited by examiner

*Primary Examiner* — Marina A Tietjen
(74) *Attorney, Agent, or Firm* — Greer, Burns & Crain, Ltd.

(57) ABSTRACT

A water supply system for use in an aircraft, and a method for preventing blockages in a water supply system in an aircraft. The system comprises a central water tank comprising a fluid inlet and a fluid outlet, a supply conduit for permitting fluid flow from the outlet of the central water tank to a user equipment. At least a section of the supply conduit is connected and thermally coupled to an aircraft air duct so as to enable a transfer of thermal energy to the supply conduit therefrom to maintain the temperature of the water in the supply conduit above the freezing temperature thereof.

16 Claims, 6 Drawing Sheets

WATER SUPPLY SYSTEM FOR USE IN AN AIRCRAFT AND A METHOD FOR PREVENTING FREEZING OF WATER LINES

CROSS-REFERENCES TO RELATED APPLICATIONS

This application claims the benefit of European Patent Application Number 23171369.4 filed on May 3, 2023, the entire disclosure of which is incorporated herein by way of reference.

FIELD OF THE INVENTION

The present invention relates to a water supply system for use in an aircraft, and an associated method for preventing freezing or icing therein.

BACKGROUND OF THE INVENTION

An aspect of the present invention relates to a water supply system for use in an aircraft. The system comprises a central water tank comprising a fluid inlet and a fluid outlet and a supply conduit for permitting fluid flow from the outlet of the central water tank to a user equipment. At least a section of the supply conduit is connected (e.g., physically coupled to) and thermally coupled to an aircraft auxiliary conduit so as to enable a transfer of thermal energy to the supply conduit therefrom to maintain the temperature of the water in the supply conduit above the freezing temperature thereof.

A water supply system (e.g., a potable water supply system) is used to provide fresh water in a sufficient amount and quality to all kinds of consumer equipment on-board large passenger aircraft. To distribute the fresh water throughout the aircraft cabin, a pipe network is installed between a central water storage tank and the decentralized user equipment in the aircraft cabin. A user equipment may be an apparatus that is directly used by a user (e.g., a faucet) as well as the buffer tank, pump and other equipment that provide the apparatus with the required water to function. The pipe network installation usually takes place in the underfloor area of an aircraft.

The ambient temperatures in the underfloor area can lead to freezing of contained water, which may be particularly relevant in the case of pipes having a small diameter, in which water therein can freeze more rapidly. This condition can lead to blocking and/or rupture of water pipes, meaning that some or all of the water supply function on the aircraft is no longer available due to system damage.

Present efforts to avoid these effects result in special precautions being taken. For example, pipes/conduits may be installed in specially selected installation routes running through areas being sufficiently far from the cold outer skin of the aircraft. A further solution is to install electrical ice protection equipment to prevent unwanted freezing of water in the pipes. While potentially effective, these efforts have the drawbacks that they may permit only a rather restricted volume of space to be used within the aircraft for the water supply system. Where ice protection equipment is used, this equipment may be relatively complex and may significantly increase the weight of the water supply system (in some cases by more than double), and may significantly increase the cost of the water supply system. In addition, installation efforts are greater and require more time and cost.

SUMMARY OF THE INVENTION

Therefore, an object of the invention is to provide an inexpensive, low-weight and low-cost water supply system for an aircraft that is resistant to blockages due to water freezing therein.

The object may be achieved in that the supply conduit of the water system is thermally coupled to an aircraft auxiliary conduit so as to enable a transfer of thermal energy to the supply conduit from the auxiliary conduit. In doing so, the temperature inside the supply conduit is increased to, and maintained at, a temperature above freezing, thus preventing the formation of ice inside the supply conduit and the blocking/rupture thereof. Since auxiliary conduits are already present in aircraft, the use of an auxiliary conduit requires no, or minimal, additional equipment to provide the desired effect. This has the additional benefits of allowing existing ice protection/de-icing equipment to be removed from the aircraft, thus decreasing the weight and equipment cost of the aircraft, as well as reducing the installation time and subsequent amount of maintenance work required for upkeep of de-icing measures, and also providing a reduction in electrical power consumption of the water line ice protection system.

In one embodiment the auxiliary conduit is an air duct, and further advantage in case of the auxiliary conduit being formed as an air duct is, that there is knowledge of the exact temperature in the air ducts which is a function of the current configuration of the air conditioning system. The detailed temperature distribution in the area where water systems are normally installed is rather unknown.

A further advantage of the present invention is the faster start-up of the aircraft after cold soak (e.g., overnight parking at −55° C. ambient temperatures). While conventional unheated water lines require a significantly longer time to reach a ready to start temperature (temperature above freezing level), since the entire installation environment must be heated up from very cold temperatures. By contrast the present innovation enables a very short time between start-up of the aircraft and start-up of the water system since the required environment which needs to be heat-up is smaller.

According to one embodiment, the supply conduit may extend along the axial direction of the auxiliary conduit. The supply conduit may extend parallel to the longitudinal axis of the auxiliary conduit. The auxiliary conduit may be used as a support structure to route the supply conduit to a desired location, thus preventing the need to attach the supply conduit to the aircraft itself. The supply conduit may be retrofitted onto an existing auxiliary conduit of an aircraft.

The supply conduit may be located within an enclosure, and the enclosure may be coupled to the auxiliary conduit. The enclosure may comprise a cavity in which the supply conduit is located, surrounded by a support element. The enclosure may be coupled to the auxiliary conduit in any appropriate way, for example by bolts, screws, ties, magnets, chemical bonding (e.g., glue) or the like. The enclosure may comprise an opening and/or perforations therein to enable a flow of air therein. Thus, the enclosure may permit transfer of thermal energy by convection. The enclosure may be formed of, or may comprise, a material having a high thermal conductivity such as copper, steel, aluminum, or the like. Thus, the enclosure may permit transfer of thermal energy additionally or alternatively by conduction.

A thermal conduction element may extend between the auxiliary conduit and the enclosure to assist the transfer of thermal energy therebetween. The thermal conduction element may be in the form of a coupling, which may also assist to hold the enclosure in place on the auxiliary conduit. The thermal conduction element may be or comprise a material having a high thermal conductivity. The thermal conduction element may be or comprise a channel (e.g., may be a tube or conduit element) that connects the cavity of the enclosure with the interior of the auxiliary conduit such as an air duct so as to permit a flow of the medium in the conduit such as air from the auxiliary conduit directly into the enclosure. In case the auxiliary conduit is formed as an air duct, a fan or similar may be present to assist to direct air flow through the thermal conduit and into the enclosure, thus providing forced transfer of thermal energy (e.g., via forced convection) from the air duct to the enclosure.

The enclosure may be an elongate enclosure, and may be configured to extend along the axial direction of the auxiliary conduit. The enclosure may be directly coupled to an external surface of an auxiliary conduit.

The enclosure may comprise a cover located radially outwardly of the supply conduit, and the cover may comprise a thermal insulator. A thermal insulator may be or comprise a material with a particularly low thermal conductivity. A thermal insulator may be a material which encapsulates gas or air, for example in pockets or bubbles. A thermal insulator may therefore be a foam material, a gel, a material formed with or into a lattice structure, a bubble-formed plastic material, or the like. The cover may be able to be removed by a user, for example to insert a supply conduit or conduits therein, or to repair or replace supply conduits, or any other objects within the enclosure, if necessary. The cover may also facilitate the use of supply conduits having forked sections, by permitting a section of supply conduit to be run out of the enclosure if necessary.

The supply conduit may be located between the auxiliary conduit and a thermal insulator extending circumferentially around the auxiliary conduit. The insulator (e.g., the thermal insulator) may extend circumferentially continuously around the auxiliary conduit.

The supply conduit may be located in a discontinuity of a thermal insulator extending circumferentially discontinuously around the auxiliary conduit. The supply conduit may be located in the enclosure, where the enclosure is located in the discontinuity. The enclosure may extend circumferentially around the auxiliary conduit (e.g., around a part of the circumference of the auxiliary conduit). The supply conduit and, where relevant, the enclosure, may be completely contained within the discontinuity. The discontinuity may assist to protect the supply conduit and/or the enclosure from external forces acting thereon to accidentally dislodge the supply conduit and/or the enclosure. Additionally, the enclosure and/or the supply conduit may be better insulated by the insulator when placed in the enclosure, and transfer of thermal energy may be less restricted by the insulator, which may therefore facilitate transfer of thermal energy from the auxiliary conduit to the supply conduit.

The supply conduit may be located externally of a thermal insulator extending circumferentially around an auxiliary conduit. A secondary thermal insulator may be positioned radially externally of the supply conduit, and may be attached and/or physically in contact with the supply conduit.

The diameter of the supply conduit may be smaller than the diameter of the auxiliary conduit. As such, the energy required to be taken from the auxiliary conduit in order to maintain the temperature of the water therein above freezing may be relatively insignificant relative to the volume of air therein, and therefore any effect on the functioning of the air conduit may be limited.

The supply conduit may be thermally coupled to an auxiliary conduit having an internal temperature of above 10 degrees Celsius, preferably between 1° and 30° C. The temperature may be a desirable temperature for an aircraft cabin, or in some cases may be above a desirable temperature of an aircraft cabin to account for cooling as the air is routed around the aircraft, and/or to account for mixing with air of a cooler temperature. In case the water is heated to temperatures up to 25° C. or higher, than the invention also allows to eliminate the water heater in the lavatories since water is supplied with ready to use temperatures for the water faucets. In this case a one-temperature faucet is enabled without a heater.

The water supply system may comprise a plurality of supply conduits coupled to the auxiliary conduit. The plurality of supply conduits may supply a plurality of user equipment. In some examples, the plurality of supply conduits may assist to prevent freezing therein, for example by permitting an exchange of thermal energy between the plurality of supply conduits.

The water supply system may be a high-pressure water supply system.

An aspect of the invention relates to a method for preventing blockages in a water supply system in an aircraft, the method comprising providing a supply conduit for permitting fluid flow from an outlet of a central water tank to a user equipment, thermally coupling the supply conduit to an aircraft auxiliary conduit so as to enable a transfer of thermal energy to the supply conduit therefrom, and providing thermal energy to the supply conduit from the aircraft auxiliary conduit so as to maintain the temperature of the water in the supply conduit above the freezing temperature thereof.

An aspect of the invention relates to an aircraft comprising the water supply system as described in any of the preceding paragraphs.

BRIEF DESCRIPTION OF THE DRAWINGS

In the following, the invention will be described further with regard to the exemplary embodiments shown in the drawings, wherein.

DETAILED DESCRIPTION OF THE PREFERRED EMBODIMENTS

Figure 1:
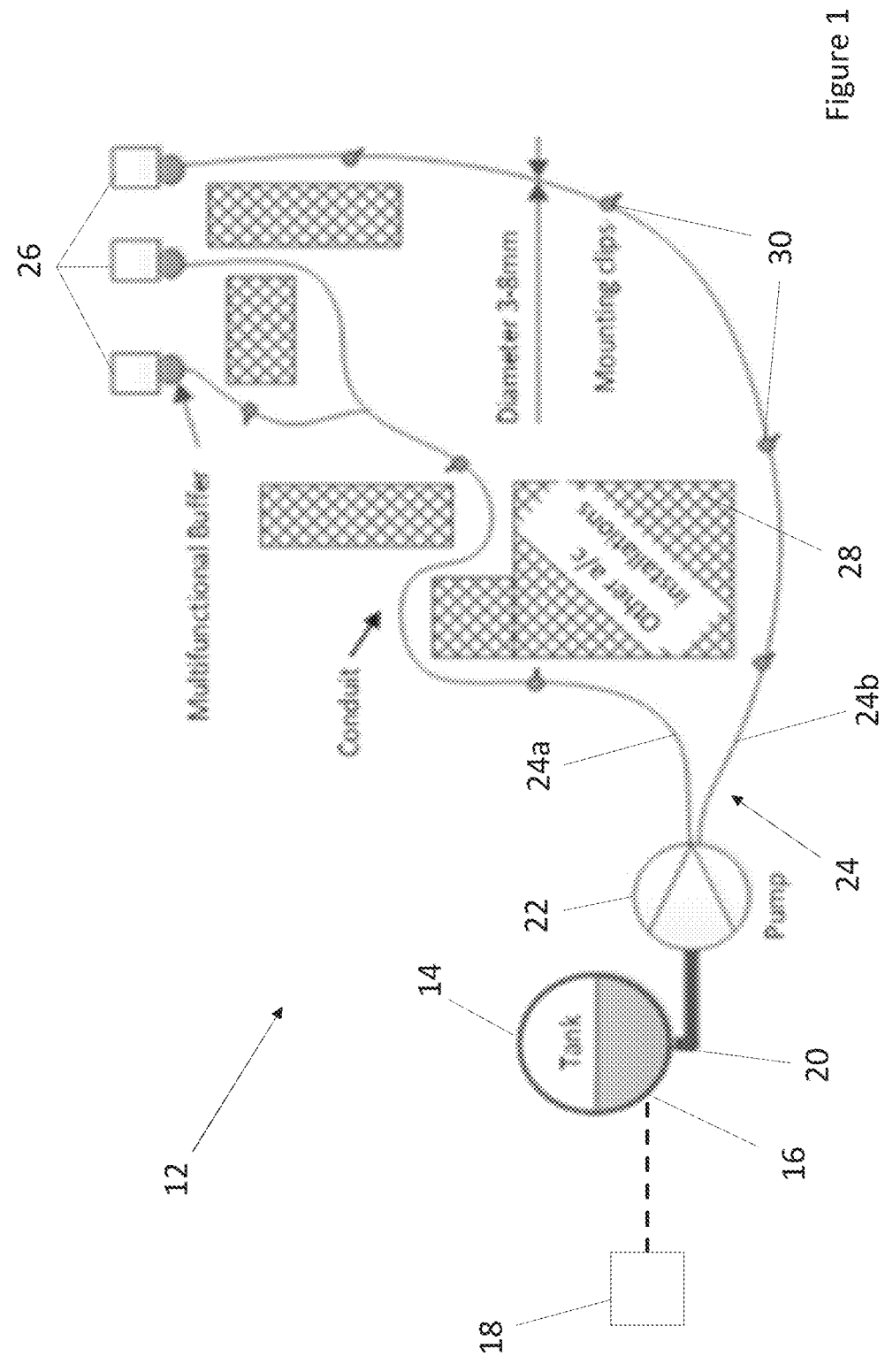
FIG. 1 is a schematic view of a water supply system for an aircraft.

FIG. 1 is a schematic illustration of a water supply system 12 for an aircraft 10 according to the present disclosure. The water supply system 12 comprises a central water tank 14 comprising an inlet 16 and an outlet 20. Although the inlet 16 and the outlet 20 are illustrated as separate and distinct from one another, it may be equally conceivable that the inlet and the outlet 16, 20 are the same entity, for example are provided by the same (e.g., a single, common) port. The inlet 16 may be permanently or intermittently connected to a water supply 18 from which the central water tank 14 is provided with water. For example, the central water tank 14 may be provided with water while the aircraft 10 in which it is located is grounded, and may be disconnected from the water supply 18 while the aircraft 10 is in flight.

In this example, the central water tank 14 is in fluid communication with a fluid pump 22 which may facilitate removal of water from the tank 14 and into a supply conduit 24. The supply conduit 24 may, in some examples, be a high pressure supply conduit, and the fluid pump 22 may assist to increase the pressure of water in the supply conduit 24 to an acceptable level. In particular, the pressure level may be at least 2 bar, wherein the specific level depends on the size of the aircraft, the number of consumer assemblies being provided with water from the central water tank, the type of equipment, the diameter of the conduits employed in the system, the storage capacity of the buffer tanks and the topology of the entire water supply system. It should also be noted that, in some cases, no fluid pump 22 may be present or necessary, for example in cases where the central water tank 14 is pressurized and thus the pressure inside the central water tank 14 may be sufficient to establish sufficient fluid flow therefrom.

The supply conduit 24 is in fluid communication with at least one user equipment 26, and in FIG. 1 a plurality of user equipment 26 are illustrated. As such the supply conduit 24 permits fluid flow between the central water tank 14 and the user equipment(s) 26. The user equipment(s) 26 may be, for example a sink/faucet, a toilet, a drinking fountain, a buffer tank, galley water consumers such beverage makers, steam ovens etc., or the like. In this example, the supply conduit 24 comprises a fork (here downstream of the pump 22) and the supply conduit 24 is separated into a first and a second supply conduit 24a, 24b. In some examples, a single, unforked supply conduit 24 may be present, while in others, the supply conduit may comprise, or separate into, any number of supply conduits 24a-n. As such, an arrangement of supply conduits 24 may be present.

The supply conduit 24 may be suitable to convey a flow of water from the central water tank 14 as necessary, for example at a desired pressure and a desired flow rate. The supply conduit 24 may have a diameter of between 3 to 8 mm, and may be a flexible conduit. The flexible nature of the supply conduit 24 may facilitate it to be positioned around existing aircraft installations 28 such as seats, cargo holds, through cavities between structural elements, through openings in such elements and the like.

The supply conduit 24 is held in place by connection means 30, illustrated schematically in FIG. 1. The connection means 30 may connect the supply conduit 24 to an air duct, for example over some or all of its length (or over some or all of the length of at least one fork of the supply conduit 24).

Figures 2A, 2B:
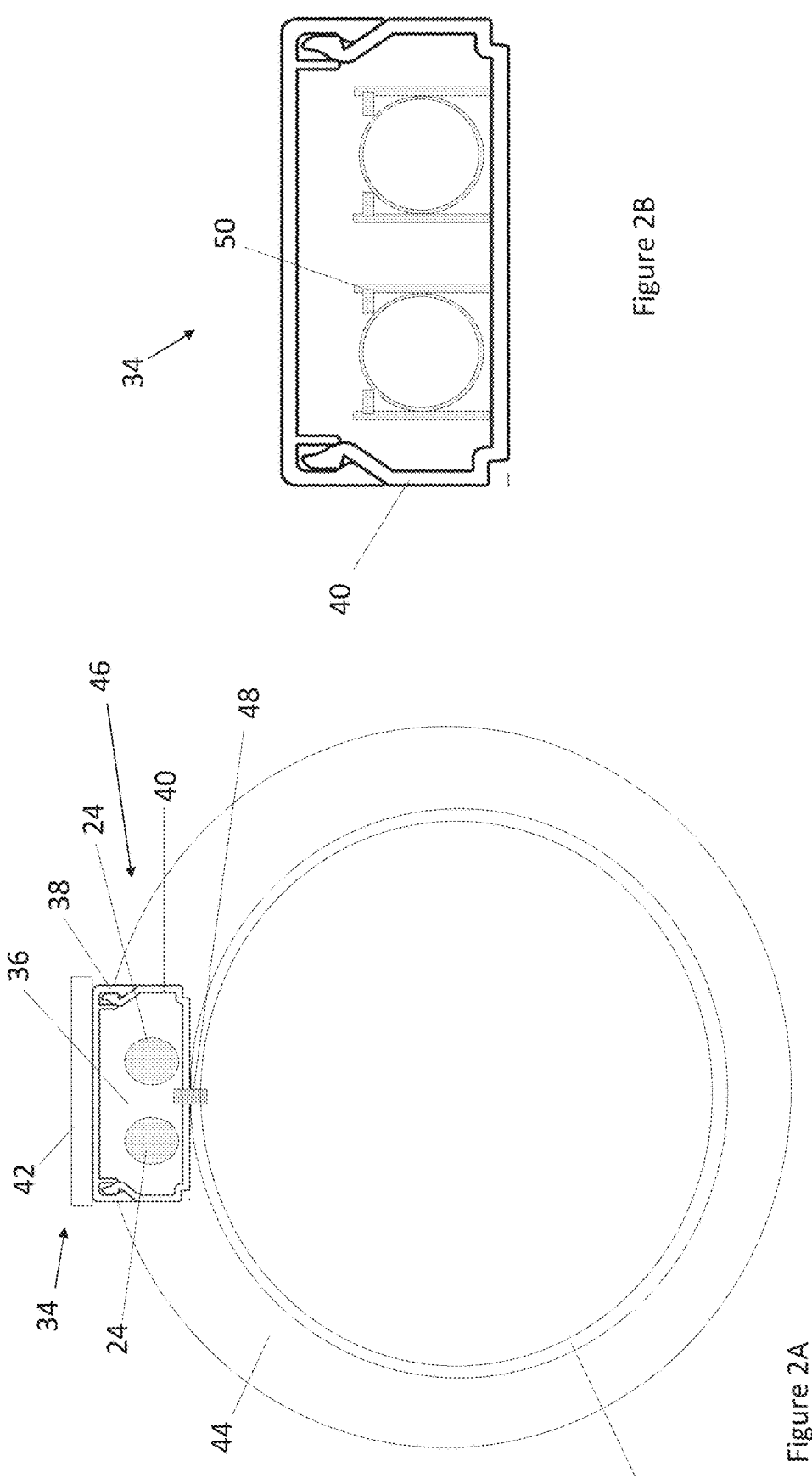
FIG. 2A is a schematic, cross-sectional view of an air duct and supply conduits according to one or more embodiments.
FIG. 2B is a schematic, cross-sectional view of supply conduits in an enclosure.

FIG. 2A is an example of two supply conduits 24 and an auxiliary conduit illustrated in cross-section which conduit in the embodiments described in the following is in the form of an air duct 32. The air duct 32 may comprise a flow of air therein and may be in accordance with the standard ATA21 climate ducts. The air flow therein may be of a temperature above freezing, and which may be of a comfortable ambient temperature for an aircraft cabin. The air in the air duct 32 may be between 1° and 30° C., for example between 2° and 25° C., for example 20° C. The supply conduits 24 are located in an enclosure 34, which may be in the form of a raceway. The enclosure 34 also provides a spray shield, spay protection cover or even a shrouding, so that additional safety measures can be avoided with. Illustrated in further detail in FIGS. 5 and 6, the supply conduit(s) 24 (and in this example also the enclosure) extends along the length of the air duct 32 and may be physically connected to the air duct 32 by any appropriate means, for example by a bolt, tie, glue, or the like. In this example, the supply conduits 24 are connected to the air duct 32 via the enclosure 34 in which they are located. The enclosure 34 is therefore directly connected to the air duct 32, and may be connected to the air duct 32 in any appropriate way, such as by a bolt, tie, glue or the like. In this example, the enclosure 34 may be bolted or screwed in place. Thermal transfer may take place between the air duct 32 (e.g., an outer surface thereof, the flow of air therein, or the like) by conduction through the wall of the air duct 32 and through the enclosure 34.

The enclosure comprises a receiving portion 40 in which a cavity 36 is defined, and in which the supply conduits 24 are located. The receiving portion 40 may be made from any suitable thermally conducting material such as aluminum, steel, or the like, to facilitate thermal conduction from the air duct 32 and into the cavity 36. Locating the supply conduits 24 in the cavity 36 may physically protect the supply conduits 24 e.g., from external forces such that they do not become dislodged, and/or may provide thermal protection to the supply conduits 24 such that they are insulated against low temperatures external to the enclosure 34, and external to the air duct 32. In some examples, the cavity 36 may comprise an insulator therein. In addition, the enclosure 34 comprises a cover 38. The cover 38 is located radially outwardly of the receiving portion 40 in this example, although in other examples may be located in a different position on the enclosure 34. The cover 38 may provide physical protection to the contents of the cavity 36 (e.g., the supply conduits 24) and may additionally provide thermal insulation thereto. In this example, the cover 38 comprises a cover insulator 42 which may be located thereon or integrated into, or may define, the cover 38.

The cover 38 may attach to the receiving portion 40 in any appropriate way, for example by a latch, screw, snapfit, magnet or the like. In this example, the cover 38 attaches to the receiving portion 40 via a snapfit connection.

Located radially outwardly of the air duct 32 is a duct insulator 44. In this example the insulator extends circumferentially discontinuously around the air duct 32. The insulator 44 comprises a circumferential interruption 46 (e.g. a discontinuity) therein in which the enclosure 34 is located. In doing so, the duct insulator 44 may assist to insulate the enclosure 34, and may also permit the enclosure 34 to be located closer to the air duct 32, thus improving the thermal connection therebetween and increasing the rate at which thermal energy may be transferred between the air duct 32 and the supply conduits 24 located in the enclosure 34.

Although not illustrated, the enclosure 34 may comprise perforations therein to assist with heat conduction thereto, for example by permitting a direct connection between the cavity 36 and the outer surface of the air duct 32, and optionally by permitting convection heat transfer into the cavity 36, for example from the outer surface of the air duct 32. A coupling 48, or a plurality thereof, may extend from the air duct 32 to the enclosure 34, for example may extend from a location internal to the air duct 32 to a location internal to the enclosure 34, for example for the purpose of increasing thermal conductivity therebetween. The coupling 48 may therefore assist to thermally couple the supply conduit 24 to the air duct 32. The coupling 48 may be made from a material having high thermal conductivity such as aluminum, steel, or the like, and may permit thermal conductivity without interference from any insulators which may be surrounding the air duct 32.

FIG. 2B illustrates an enclosure 34 in further detail. In this example, the supply conduits 24 are held in place by supports 50. The supports 50 may assist to hold the supply conduits 24 in place relative to the receiving portion 40 and may be in any appropriate form such as a clip, jaw, tie or the like.

Figure 3:
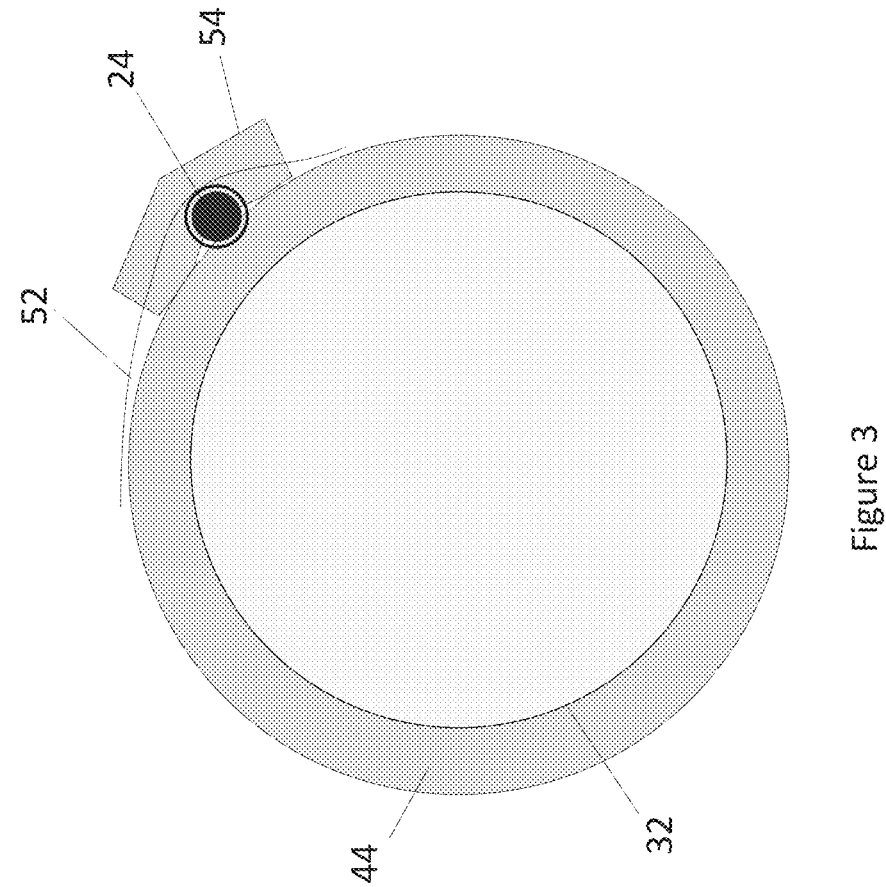
FIG. 3 is a schematic, cross-sectional view of an air duct and supply conduits according to one or more embodiments.

In FIG. 3 an alternative configuration of an air duct 32 and supply conduit 24 are illustrated. In this example, only one supply conduit 24 is illustrated alongside the air duct 32. Here, an insulator 44 extends circumferentially continuously around the air duct 32. The supply conduit 24 is positioned radially outwardly of the insulator 44 extends along an outer surface thereof. The supply conduit 24 may be held in place by any appropriate means, and in this example is held in place by fixing tape 52, although may also be held in place, for example, by a tie, chemical bond (e.g., glue) or the like. A secondary insulator 54 is then laid over the supply conduit 24, so as to thermally protect the supply conduit 24 from the external environment, which may be in the fuselage of an aircraft 10 that may be prone to temperatures of less than the freezing temperature of the water in the supply conduit 24. The secondary insulator 54 may equally be held in place by fixing tape, a tie, chemical bond or the like. Such a configuration may permit the supply conduit 24 to be retrofitted onto existing air ducts 32. Although insulated, the air ducts 32 may provide sufficient heat that the temperature inside the supply conduit 24 is able to be maintained above freezing. Although not illustrated, a thermal conductor (e.g., metal wire, such as copper wire, steel wire, aluminum wire) may extend through the insulator 44 of the air duct 32 to improve the thermal conductivity to the supply conduit 24.

Figure 4:
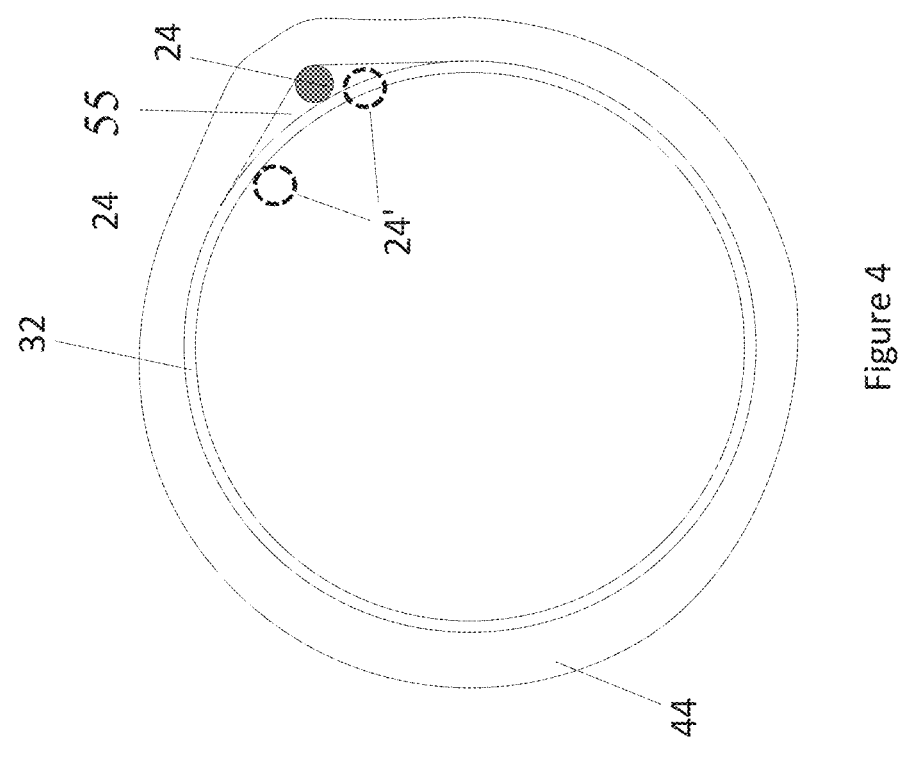
FIG. 4 is a schematic, cross-sectional view of an air duct and supply conduits according to one or more embodiments.

FIG. 4 illustrates yet another configuration of an air duct 32 and a supply conduit 24. In this example, an insulator 44 extends continuously circumferentially around the air duct 32, while a supply conduit 24 is contained in an interstice 55 between the insulator 44 and the air duct 32. However, it is also conceivable that the supply conduit 24' is positioned on the inner surface of the air duct 32 or integrated in the wall as indicated by the conduits 24' shown in dashed lines. The supply conduit 24 may be held in place by the insulator 44, for example may be held to an outer surface of the air duct 32 by the insulator 44. Alternatively or additionally, the supply conduit 24 may be held in place by tape, a tie, chemical bonding (e.g., glue) or the like. In the configuration of FIG. 4, no enclosure (e.g., as in FIGS. 2A and 2B) may be required to hold the supply conduit 24 and the lack of insulation between the supply conduit 24 and the outer surface of the air duct 32 may permit a large degree of thermal energy transfer (e.g., by conduction) to occur between the air duct 32 and the supply conduit 24.

Figures 5, 6:
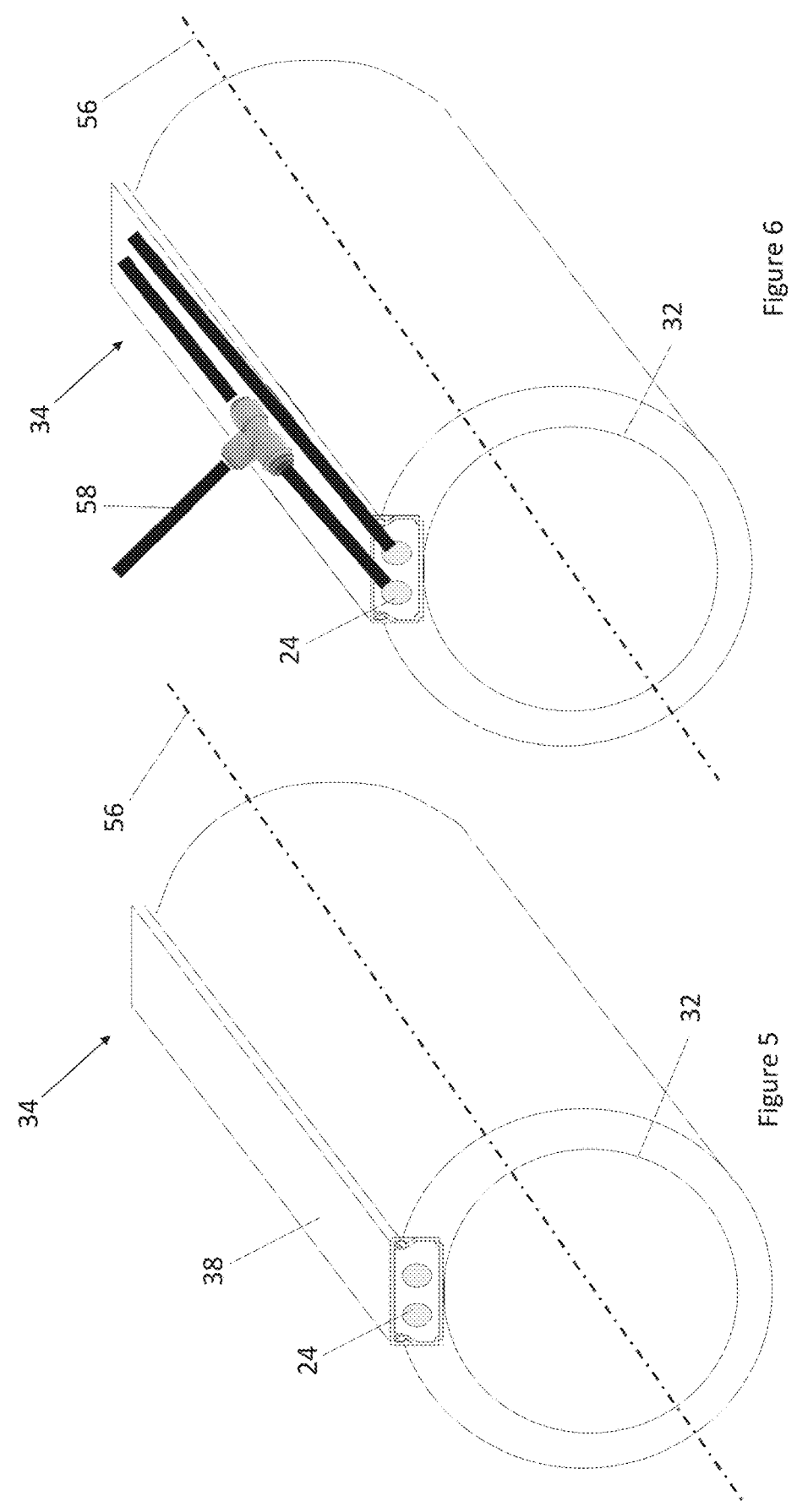
FIG. 5 is a schematic, top and front view of an air duct and supply conduits according to one or more embodiments.
FIG. 6 is a schematic, top and front view of an air duct and supply conduits according to one or more embodiments.

FIGS. 5 and 6 illustrate examples (similar to that of FIGS. 2A and 2B) in a perspective view. Here, it can be seen that the supply conduit 24 and the enclosure 34 extend along the length of the air duct 32, and extend along the longitudinal axis 56 of the air duct 32, e.g., parallel to the longitudinal axis 56 or extending along the longitudinal axis 56 in a helical shape around the longitudinal axis 56. In the example of FIG. 5, the enclosure 34 comprises a cover 38, while in the example of FIG. 6, no cover is present and the enclosure

34 is open. In this example, the supply conduits 24 comprise a branch 58 which is able to extend from the enclosure 34. In some examples the enclosure 34 may comprise sections which are covered, and sections which are not covered, for example because they contain a branch 58.

Figure 7:
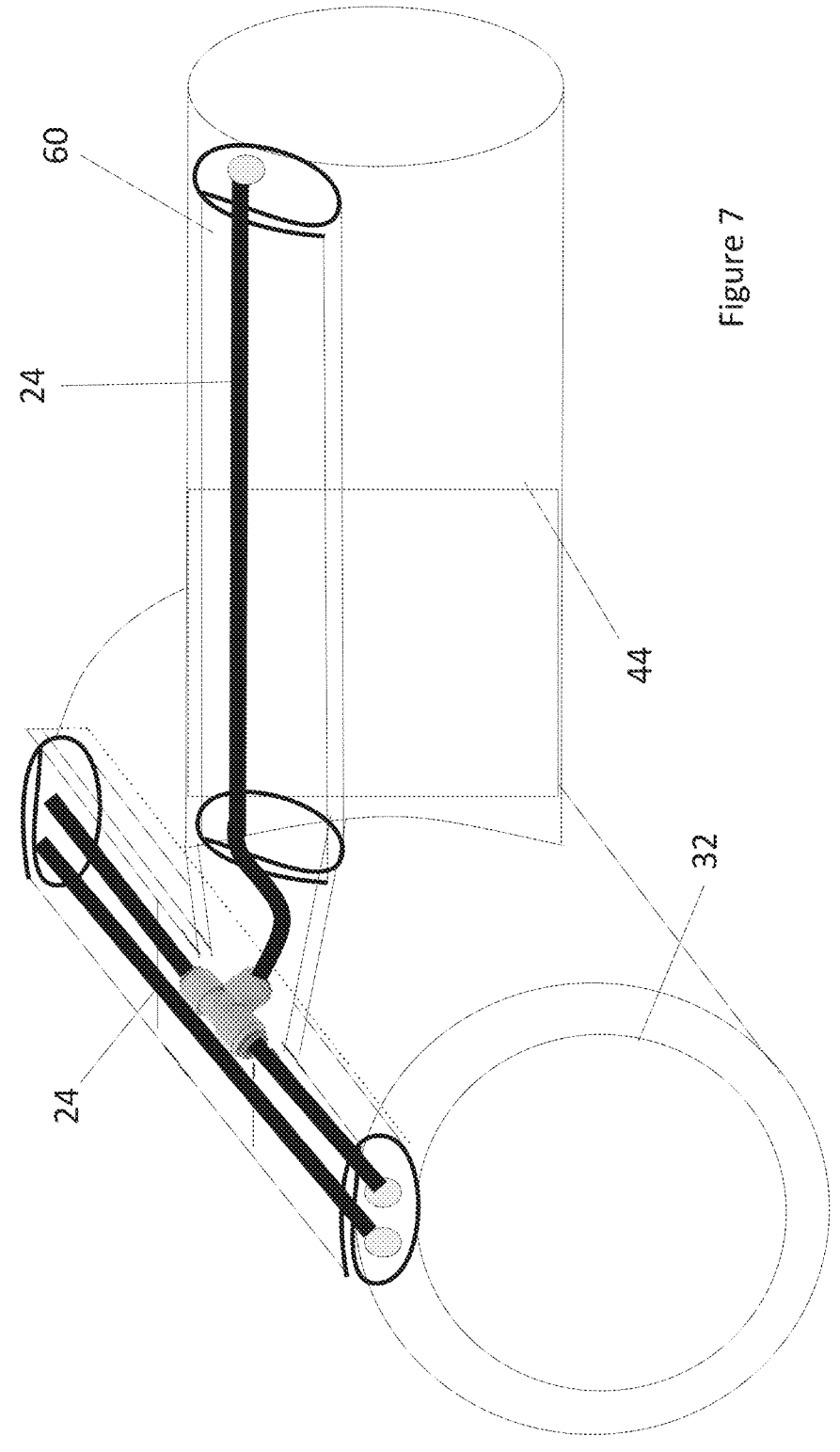
FIG. 7 is a further schematic, top and front view of an air duct and supply conduits according to one or more embodiments; and, FIG. 8 is a schematic view of an aircraft.

A further example of an air duct 32 and supply conduits 24 is illustrated in FIG. 7. Here, the air duct 32 has a T-shape, as does one of the associated supply conduits 24. In this example, the supply conduits 24 are connected (e.g., physically connected) to the air ducts 32, as well as also being thermally coupled thereto. Here, the supply conduits 24 are contained in a sleeve 60. The sleeve 60 may be connected to the air duct 32 (e.g. directly to the air duct 32 or to the insulator 44 of the air duct 32) by any appropriate means such as by a tie, cable, bolt, glue or the like. The sleeve 60 may assist to connect (e.g., couple) the supply conduit 24 to the air duct 32. As such, the sleeve 60 may be used to easily retrofit a supply conduit 24 to an air duct 32.

The sleeve 60 may additionally be or comprise a thermal insulator. For example, a portion of the sleeve 60 that is located radially outwardly of the supply conduit 24 may comprise a thermal insulator. In some examples the entire sleeve 60 may be or comprise a thermal insulator. Thus, the sleeve 60 may additionally protect the supply conduit 24 from the conditions external thereto, thus assisting to maintain the temperature internal to the supply conduit 24 above the freezing temperature of the water therein.

The sleeve 60 may be in the form of a wrap, which may be able to be wrapped around the supply conduit 24 or conduits, and may comprise a fastener (e.g., Velcro, a loop and hook or similar, etc.) to hold the sleeve 60 in place. The sleeve 60 may be in the form of a spiral of material which may be positioned around the supply conduit 24.

In such examples, the sleeve 60 may be provided in place of an enclosure (as illustrated in the previous Figures) or may be provided in addition to an enclosure, such that the sleeve is located in the enclosure.

Figure 8:
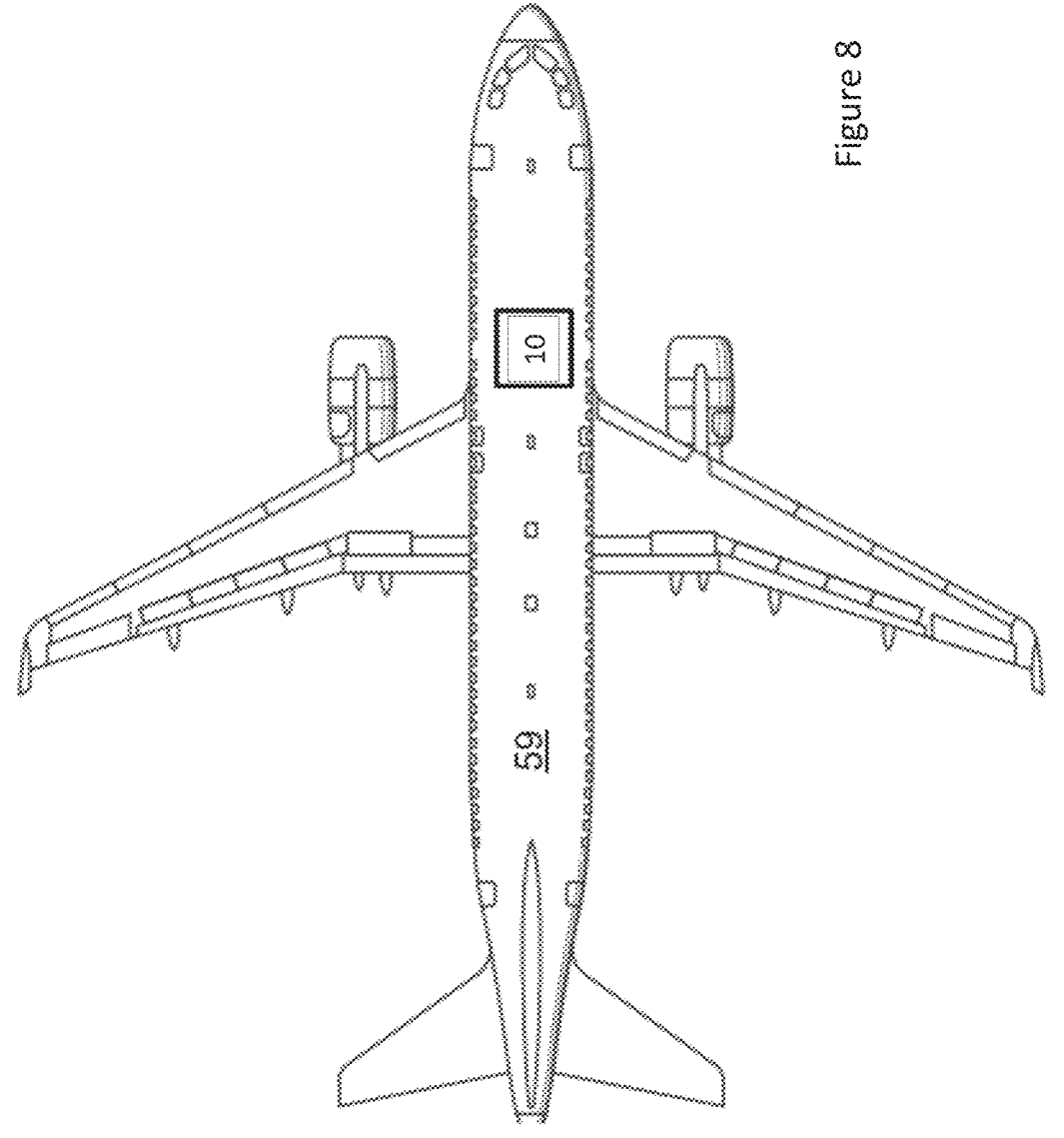

FIG. 8 illustrates an aircraft 10 in which a water supply system could be located. The aircraft comprises fuselage 59 which may become very cold (e.g., may reach a temperature significantly below freezing temperature) during flight. The fuselage may additionally be made from metal and thus may be a poor insulator against the external cold temperatures during flight. The main air duct 32 and the supply conduit 24 can be installed in the triangle area of the aircraft, i.e. laterally below the cabin floor, e.g., in the form of a triangle module. However, air ducts 32 can also be designed as riser ducts following the circumference of the aircraft fuselage or they can be located in the crown area of an aircraft fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS

10 Aircraft
12 Water supply system

14 Central water tank
16 Inlet (of central water tank)
18 Water supply
20 Outlet (of central water tank)
22 Fluid pump
24 Supply conduit
26 User Equipment
28 Aircraft installation
30 Connection means
32 Air duct
34 Enclosure
36 Cavity
38 Cover
40 Receiving portion
42 Cover insulator
44 Duct insulator
46 Insulator interruption
48 Coupling
50 Support
52 Fixing tape
54 Secondary insulator
56 Air duct longitudinal axis
58 Branch
59 Fuselage
60 Sleeve

The invention claimed is:

1. A water supply system for use in an aircraft, the water supply system comprising:
a central water tank comprising a fluid inlet and a fluid outlet;
a supply conduit configured to permit fluid flow from the fluid outlet of the central water tank to a user equipment;
wherein at least a section of the supply conduit is connected and thermally coupled to an aircraft auxiliary conduit so as to enable a transfer of thermal energy to the supply conduit therefrom to maintain a temperature of water in the supply conduit above a freezing temperature thereof; and
wherein the supply conduit is disposed within an enclosure, the enclosure coupled to the aircraft auxiliary conduit.

2. The water supply system of claim 1, wherein the aircraft auxiliary conduit is an air duct.

3. The water supply system of claim 1, wherein the supply conduit extends along an axial direction of the aircraft auxiliary conduit.

4. The water supply system of claim 1, wherein the enclosure is an elongate enclosure configured to extend along an axial direction of the aircraft auxiliary conduit.

5. The water supply system of claim 1, wherein the enclosure is directly coupled to an external surface of the aircraft auxiliary conduit.

6. The water supply system of claim 1, wherein the enclosure comprises a cover located radially outwardly of the supply conduit, the cover comprising a thermal insulator.

7. The water supply system of claim 1, wherein the supply conduit is disposed between the aircraft auxiliary conduit and a thermal insulator extending circumferentially around the aircraft auxiliary conduit.

8. The water supply system of claim 1, wherein the supply conduit is disposed in a discontinuity of a thermal insulator extending circumferentially discontinuously around the aircraft auxiliary conduit.

9. The water supply system of claim 1, wherein the supply conduit is located externally of a thermal insulator extending circumferentially around the aircraft auxiliary conduit.

10. The water supply system of claim 1, wherein a diameter of the supply conduit is smaller than a diameter of the aircraft auxiliary conduit.

11. The water supply system of claim 1, wherein the aircraft auxiliary conduit has an internal temperature of above 10 degrees Celsius.

12. The water supply system of claim 1, comprising a plurality of supply conduits coupled to the aircraft auxiliary conduit.

13. A method for preventing freezing or icing in a water supply system in an aircraft, comprising:
providing a supply conduit for permitting fluid flow from an outlet of a central water tank to a user equipment;
thermally coupling the supply conduit to an aircraft auxiliary conduit so as to enable a transfer of thermal energy to the supply conduit therefrom;
providing thermal energy to the supply conduit from the aircraft auxiliary conduit so as to maintain a temperature of water in the supply conduit above a freezing temperature thereof; and
wherein the supply conduit is disposed within an enclosure, the enclosure coupled to the aircraft auxiliary conduit.

14. The method of claim 13, wherein the aircraft auxiliary conduit comprises an aircraft air duct.

15. An aircraft comprising:
the water supply system of claim 1.

16. A water supply system for use in an aircraft, the water supply system comprising:
a central water tank comprising a fluid inlet and a fluid outlet;
a supply conduit configured to permit fluid flow from the fluid outlet of the central water tank to a user equipment;
wherein at least a section of the supply conduit is connected and thermally coupled to an aircraft auxiliary conduit so as to enable a transfer of thermal energy to the supply conduit therefrom to maintain a temperature of water in the supply conduit above a freezing temperature thereof;
wherein the supply conduit is disposed between the aircraft auxiliary conduit and a thermal insulator extending circumferentially around the aircraft auxiliary conduit; or
wherein the supply conduit is disposed in a discontinuity of a thermal insulator extending circumferentially discontinuously around the aircraft auxiliary conduit; or
wherein the supply conduit is located externally of a thermal insulator extending circumferentially around an aircraft auxiliary conduit.

* * * * *